US009509505B2

(12) United States Patent
Everhart et al.

(10) Patent No.: US 9,509,505 B2
(45) Date of Patent: Nov. 29, 2016

(54) GROUP MANAGEMENT OF AUTHENTICATED ENTITIES

(75) Inventors: Craig Fulmer Everhart, Pittsburgh, PA (US); Steven Ewing, Pittsburgh, PA (US)

(73) Assignee: NetApp, Inc., Sunnyvale, CA (US)

( * ) Notice: Subject to any disclaimer, the term of this patent is extended or adjusted under 35 U.S.C. 154(b) by 1070 days.

(21) Appl. No.: 13/247,333

(22) Filed: Sep. 28, 2011

(65) Prior Publication Data

US 2014/0082365 A1    Mar. 20, 2014

(51) Int. Cl.
*H04L 9/32*    (2006.01)
*H04L 9/08*    (2006.01)

(52) U.S. Cl.
CPC .......... *H04L 9/0833* (2013.01); *H04L 9/3265* (2013.01)

(58) Field of Classification Search
CPC .............. H04L 9/3294; H04L 9/3263; H04L 63/0823; H04L 63/08; H04L 63/083; G06F 21/33; G06F 21/335
USPC ......................................... 713/155, 156, 175
See application file for complete search history.

(56) References Cited

U.S. PATENT DOCUMENTS

| | | | |
|---|---|---|---|
| 6,092,201 A | 7/2000 | Turnbull et al. | |
| 6,263,435 B1 * | 7/2001 | Dondeti et al. | 713/163 |
| 6,883,100 B1 | 4/2005 | Elley et al. | |
| 7,028,180 B1 | 4/2006 | Aull et al. | |
| 7,610,614 B1 * | 10/2009 | Frankel et al. | 726/4 |
| 7,787,865 B2 | 8/2010 | Willey et al. | |
| 8,266,286 B2 | 9/2012 | Kamarthy et al. | |
| 2001/0049787 A1 | 12/2001 | Morikawa et al. | |
| 2002/0178356 A1 | 11/2002 | Mattila | |
| 2003/0056093 A1 | 3/2003 | Huitema et al. | |
| 2003/0084311 A1 | 5/2003 | Merrien et al. | |
| 2003/0126464 A1 | 7/2003 | McDaniel et al. | |
| 2003/0177352 A1 | 9/2003 | Camenisch et al. | |
| 2003/0204720 A1 | 10/2003 | Schoen et al. | |
| 2004/0054899 A1 * | 3/2004 | Balfanz et al. | 713/168 |
| 2004/0064693 A1 | 4/2004 | Pabla et al. | |
| 2004/0093493 A1 | 5/2004 | Bisbee et al. | |
| 2004/0131187 A1 | 7/2004 | Takao et al. | |
| 2004/0193919 A1 | 9/2004 | Dabbish et al. | |

(Continued)

OTHER PUBLICATIONS

Ma, et al., "A New Efficient Group Signature Scheme Based on Linear Codes," Ninth IEEE International Conference on Networks, Oct. 2001, pp. 124-129.

(Continued)

*Primary Examiner* — Ali Abyaneh
(74) *Attorney, Agent, or Firm* — Cooper Legal Group, LLC

(57) ABSTRACT

Exemplary embodiments provide various techniques for managing groups of authenticated entities. In one exemplary computer-implemented method, an entity accesses a group roster that includes a first group identifier identifying a first group, a first group digital certificate associated with the first group, and a first entity identifier identifying the entity being a member of the first group. The entity also receives a request to update the group roster. Here, the request includes a second group identifier identifying a second group and a second group digital certificate associated with the second group. In response to the request, the entity replaces the first group identifier in the group roster with the second group identifier. Additionally, in response to the request, the entity replaces the first group digital certificate with the second group digital certificate. The replacements change a membership of the entity from the first group to the second group.

22 Claims, 12 Drawing Sheets

(56) References Cited

U.S. PATENT DOCUMENTS

2004/0264697 A1   12/2004   Gavrilescu et al.
2005/0114447 A1   5/2005    Cameron et al.
2007/0150723 A1   6/2007    Estable et al.
2007/0199075 A1   8/2007    Skoric et al.
2008/0098486 A1*  4/2008    Lin et al. .................. 726/27
2009/0222668 A1   9/2009    Zaccone et al.

OTHER PUBLICATIONS

Schmidt, et al., "Proxy-based Security for the Session Initiation Protocol (sip)," Second International Conference on Systems and NetworksCommunications, Aug. 2007, pp. 42-47.

* cited by examiner

GROUP MANAGEMENT OF AUTHENTICATED ENTITIES

FIELD

The present disclosure relates generally to information security. In an example embodiment, the disclosure relates to managing groups of authenticated entities.

BACKGROUND

Systems can be grouped together to function as a cohesive unit. As an example, a group can be comprised of a group of linked computers that are programmed to work together. Many such groups are deployed to improve performance and availability over that of a single system. Before joining such a group, the identity of an individual system needs to be authenticated such that the system is permitted to join the group, and there are a variety of different certificate-based authentication systems that provide such services.

Many traditional certificate-based authentication systems are configured with a digital certificate for all the members with which the system has to communicate securely. Even though this type of authentication can be used for an extended period of time for many communication sessions, such traditional certificate-based authentication systems can be difficult to scale. For example, in order to construct a cluster of systems in which any member of the cluster may securely communicate with each other, each pair of systems within the cluster must be separately and manually configured for secure communication. However, adding or removing a system from the cluster becomes increasingly tedious as every other system within the cluster must have its configuration manually and separately updated.

SUMMARY

Example embodiments provide various techniques for managing groups of authenticated entities. As an example, a roster-based mechanism may be used. For secure communications between entities belonging to a certain group, each entity has a copy of the group roster that identifies all entities that are members within the group. Furthermore, this group roster includes information about the grouping and also cryptographic information used for secure communications between entities within the group.

The grouping information basically defines the grouping for all entities listed in the group roster, and it can include information about the group as a whole such as an identifier that identifies the group and a digital certificate that is assigned to the group as a whole. To change the information about the group, such as the group identifier or the group digital certificate, the members in the group are updated with the new information about the group. For example, an entity having a copy of the group roster receives a request to update the existing group roster. In one embodiment, this request can include a group identifier identifying a new group and a group digital certificate associated with this different group. In response to the request, the entity replaces the existing group identifier in the group roster with the newly received group identifier. In another embodiment, the entity replaces the existing group digital certificate with the newly received group digital certificate associated with the new group.

The replacement of the existing group information in the group roster with the newly received group information effectively changes the membership of a member from the existing group to the different group. Furthermore, the newly received group digital certificate allows the entity that received the request to securely communicate with the different group.

Using the techniques described herein, groups of entities can be managed by merging or splitting groups. For example, two groups of entities can be merged into a single group by transmitting a request to entities of two different groups to update their group information. In another example, a single group of entities can be split into two or more different groups by also transmitting such a request to the entities within the single group. As a result, with automatic changing of group membership based on updates of group information, each entity does not have to be individually and manually reconfigured for secure communication whenever information about the group, or the group membership, is updated.

BRIEF DESCRIPTION OF DRAWINGS

The present disclosure is illustrated by way of example and not limitation in the Figures of the accompanying drawings, in which like references indicate similar elements and in which.

DESCRIPTION OF EXAMPLE EMBODIMENTS

The description that follows includes illustrative systems, methods, techniques, instruction sequences, and computing machine program products that embody the present invention. In the following description, for purposes of explanation, numerous specific details are set forth in order to provide an understanding of various embodiments of the inventive subject matter. It will be evident, however, to one skilled in the art that embodiments of the inventive subject matter may be practiced without these specific details. In general, well-known instruction instances, protocols, structures and techniques have not been shown in detail. Furthermore, the term "exemplary" is construed merely to mean an example of something or an exemplar and not necessarily a preferred or ideal means of accomplishing a goal.

Figure 1A:
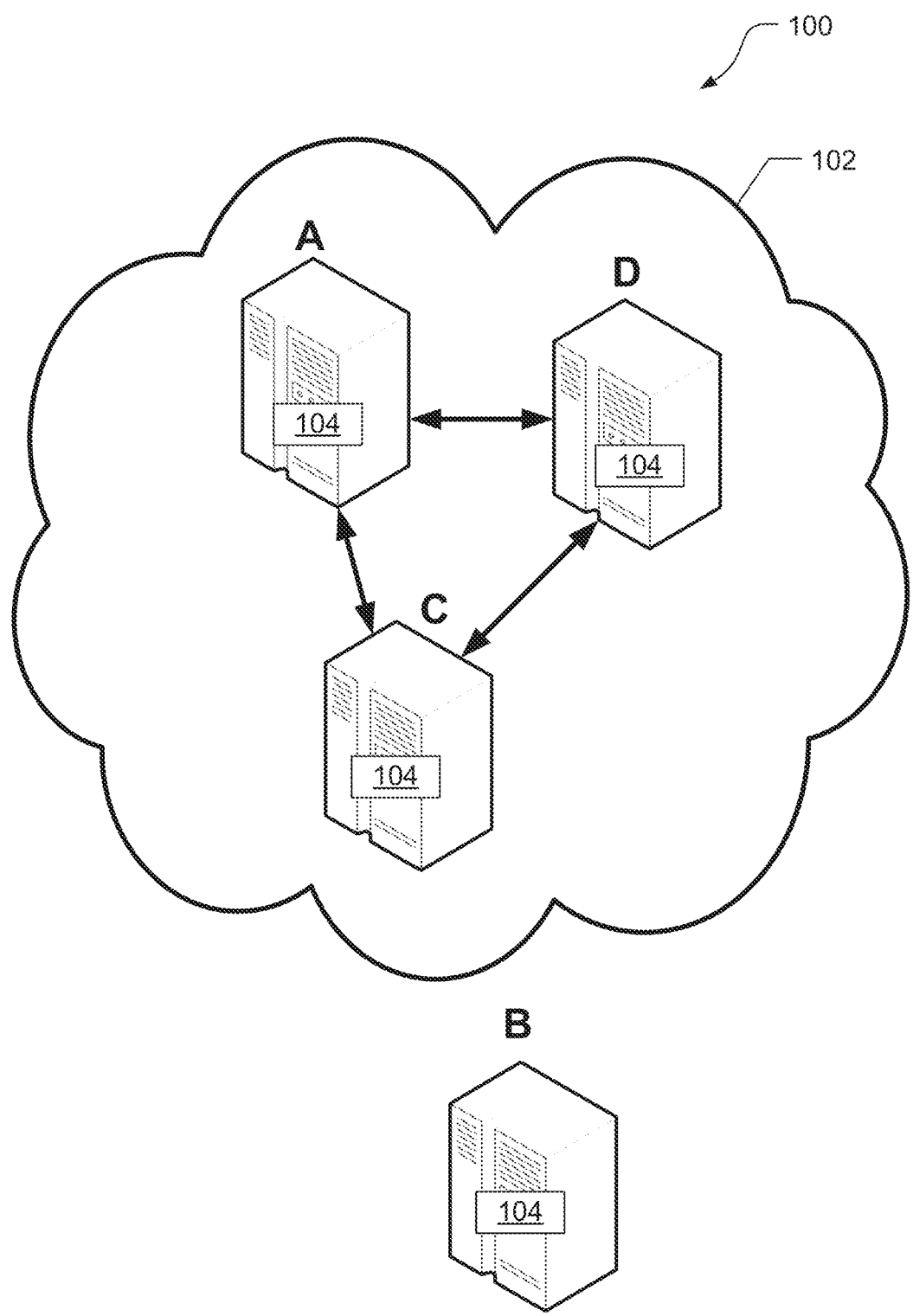
FIGS. 1A and 1B are system diagrams depicting a grouping of entities, according to embodiments of the present invention.
Figure 1B:
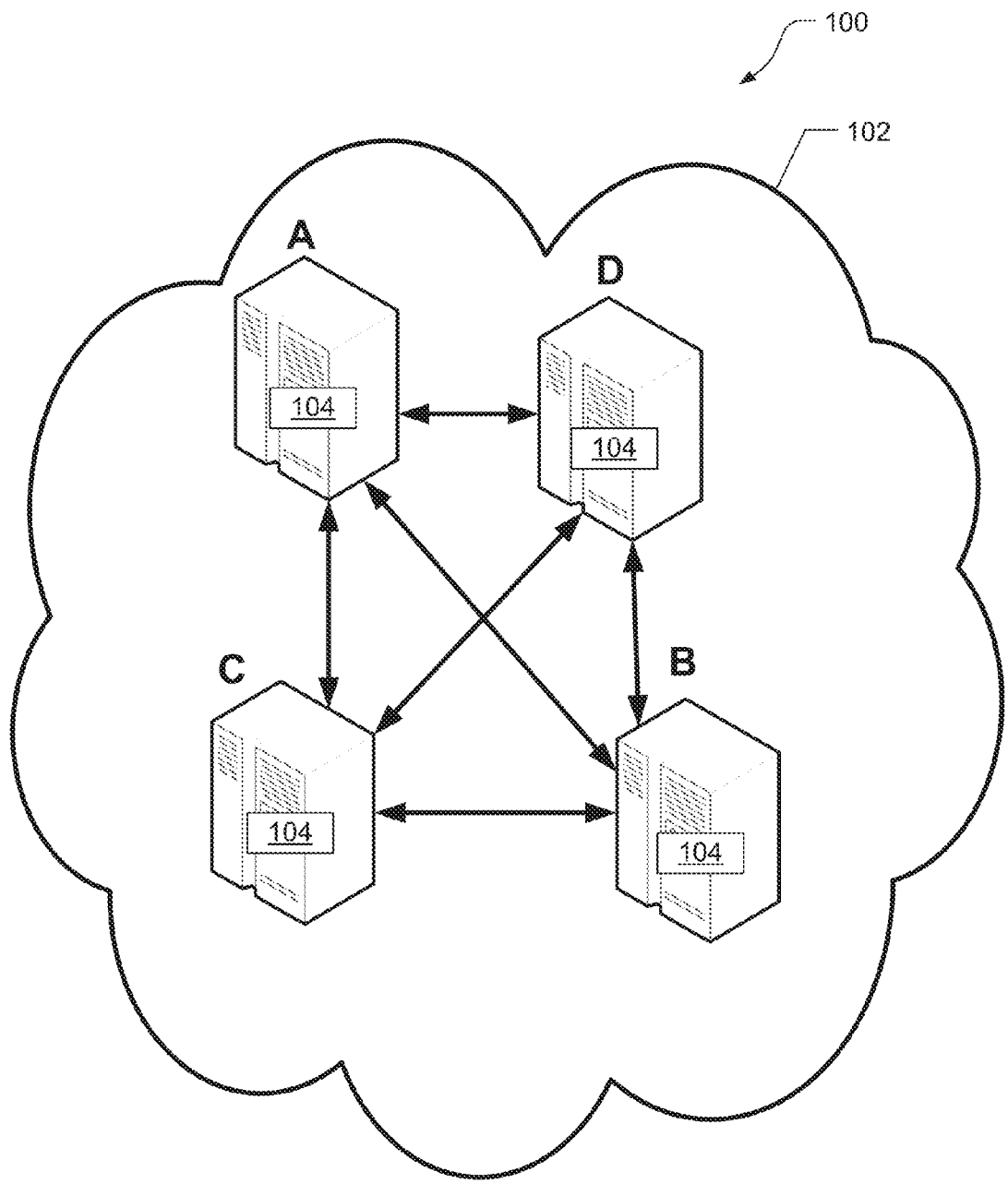

FIGS. 1A and 1B are system diagrams depicting a grouping of entities, according to embodiments of the present invention. As depicted in FIG. 1A, system 100 includes entities A, B, C, and D. An "entity," as used herein, refers to a thing that is independent of other things. An example of an entity is a user account accessible by a user using a processing system. More particularly, a user has access to a user account and in this user account, the user is identified by a username or user identifier. On a stand-alone computer or a computer that is a member of a workgroup, a user account establishes the privileges assigned to each user. The user account allows a user to authenticate to system services. Another example of an entity is a processing system, such as a computer, a storage device, a personal digital assistant, a tablet computer, or a mobile phone. Still another example of an entity is a system or cluster of processing systems. Yet another example of an entity is a grouping of entities. Here, entities A, B, and C belong to or are members of a single group 102, where communications within the group 102 are secured. For example, communication from entity A to either of entities C or D is secured. Communication from entity C to either of entities A or D is also secured. The communications among entities A, C, and D are secured such that other entities that are not members of group 102 (e.g., entity B) do not have cryptographic information to decrypt communications transmitted within group 102.

Each entity A, B, C, or D hosts a group manager module 104 that can manage groupings of authenticated entities by admitting or removing entities from the group, and by splitting or merging the groupings themselves. In one example, entity B may send a request to entity A, C, or D belonging to group 102 requesting admission into the group 102. It should be noted that such a request may be referred to as a "join request." If entity B is admitted into the group 102, then one of the group manager modules 104 associated with entity A, C, or D designated as a group management authority adds entity B along with entity B's cryptographic keys to a group roster, which is essentially a list of member entities of group 102, as explained in more detail below. As depicted in FIG. 1B, once entity B has been admitted into group 102, one or more group manager modules 104 distribute the group roster, which includes the cryptographic keys of member entities A, C, and D, to entity B. With the cryptographic keys, entity B can then directly communicate with all other entities A, C, and D within group 102. Vice versa, the group manager module 104 hosted at entity B also provides its cryptographic keys to entities A, C, and D such that these entities A, C, and D can also securely communicate with entity B.

The cryptographic keys (which may be digital certificates) are essentially used to authenticate entities A, B, C, and D. As used herein, "authentication," means that a given entity can be identified. In digital communication, essentially any message can be intercepted and altered. For example, in asymmetric cryptography with public and private keys, an interloper trying to read secret messages transmitted between entities A, C, and D within group 102 could try to publish or use his own "false" public cryptographic key, claiming that his "false" key is generated by a legitimate entity A, C, or D. Each legitimate entity A, C, or D therefore needs to be able to trust how it obtained the public cryptographic key. Authentication is the process of an entity cryptographically proving that it possesses the private key that matches the given public key. In one example, as explained in detail below, authentication in the context of embodiments of the present invention relates to the propagation of the group roster, which is a trusted listing of entities included within a group and their public cryptographic keys. A variety of known authentication techniques may be used, such as digital certificates and exchanges with shared secrets, some of which are explained in detail below.

Figure 2:
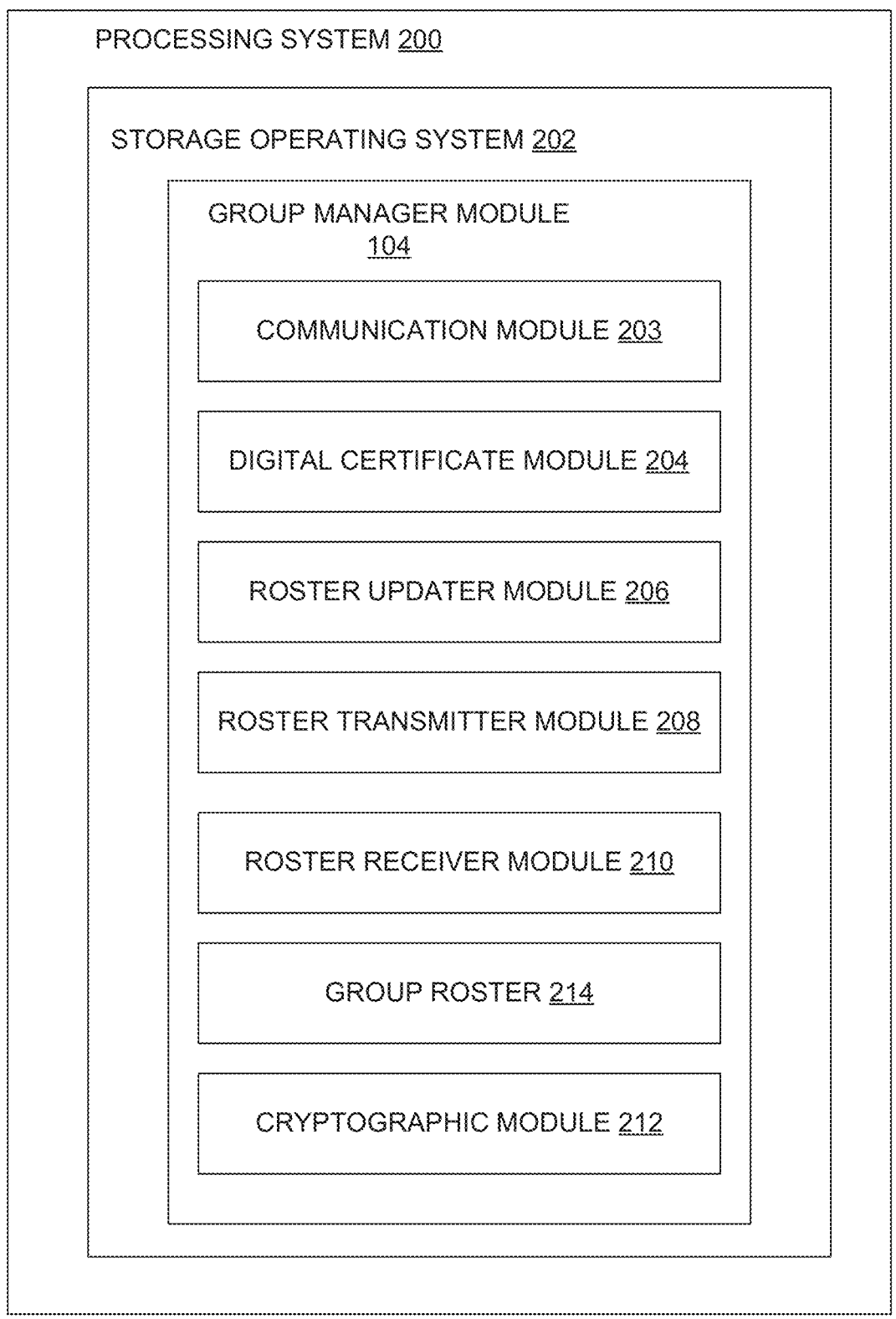
FIG. 2 is a block diagram depicting an exemplary embodiment of a group manager module that is hosted on a processing system.

FIG. 2 is a block diagram depicting an exemplary embodiment of a group manager module 104 that is hosted on a processing system 200. It should be appreciated that the processing system 200 may be deployed in the form of, for example, a personal computer, a laptop computer, a server computer, a tablet personal computer, a smart phone, or other processing systems or hardware. In one embodiment, the processing system 200 may be included in the system 100 depicted in FIGS. 1A and 1B. In various embodiments, the processing system 200 may be used to implement computer programs, logic, applications, methods, processes, or software to manage groups of entities, as described in more detail below.

As depicted in FIG. 2, the processing system 200 executes a storage operating system 202, which, in one embodiment, can be a NETAPP Data ONTAP® operating system, available from NetApp, Inc. located in Sunnyvale, Calif., that implements a file system. However, it is expressly contemplated that any appropriate file system, operating system, or application program may be enhanced for use in accordance with the inventive principles described herein. As used herein, the term "storage operating system" generally refers to the computer-executable code operable on a computer that that stores data and provides access to the data via one or more types of networks. The storage operating system 202 can be implemented as an application program operating over a general-purpose operating system, such as UNIX, or as a general-purpose operating system with configurable functionality, which is configured for storage applications as described herein. The storage operating system 202 further manages access operations to storage devices and implements a storage protocol and a driver layer that implements one or more disk access protocols.

The storage operating system 202 manages other software process and/or services executing on the processing system 200, such as a group manager module 104 that, in one exemplary embodiment, includes a communication module 203, a digital certificate module 204, a roster updater module 206, a roster transmitter module 208, a roster receiver module 210, a group roster 214, and a cryptographic module 212. The communication module 203 is configured to transmit and receive messages or other data to and from other processing systems. As an example, the communication module 203 can receive request messages from other entities. The digital certificate module 204 is configured to generate, create, or access digital certificates and other cryptographic keys. It should be appreciated that a digital certificate is an electronic credential that binds the identity of a certificate owner to a pair (public and private) of cryptographic keys that can be used to encrypt and sign information digitally. The electronic credential assures that the cryptographic keys actually belong to the specified entity. Each digital certificate may include information such as an owner's public key, owner's name or alias, expiration date of the certificate, serial number of the certificate, name of the organization that issued the certificate, digital signature of the organization that issued the certificate, and other information. Accordingly, any entity can create or generate a digital certificate by accessing such information, which may be provided by a user interfacing with the digital certificate module 204, and including it in the digital certificate. In addition, other cryptographic mechanisms allow identity to be demonstrated in other ways with other kinds of cryptographic keys, and those other mechanisms may also be used with this group management module.

The cryptographic module 212 is configured to encrypt and decrypt messages received from or transmitted to other entities using, for example, digital certificates and other cryptographic keys generated or provided by the digital certificate module 204. Also included in the group manager module 104 are a set of modules (e.g., the roster updater module 206, the roster transmitter module 208, and the roster receiver module 210) that are configured to access and manage the group roster 214. As used herein, a "group roster" refers to a list of entities that have been admitted into a group. This listing may be embodied in a variety of different data structures, such as database tables, arrays, linked lists, and other data structures. Essentially, the group manager module 104 references the group roster 214 to identify the different entities that belong to a particular group. Additionally, the group roster 214 also includes cryptographic information, and the group manager module 104 can use this cryptographic information to securely communicate with other entities within a group. Furthermore, as explained in detail below, the group roster 214 can include information about a group as a whole.

It should be noted that in other embodiments, the group manager module 104 may include fewer or more modules apart from those shown in FIG. 2. For example, in an alternate embodiment, the roster updater module 206, the roster transmitter module 208, and the roster receiver module 210 may be integrated into one module. In the example depicted in FIG. 2, the modules 203, 204, 206, 208, 210, 212, and 214 are in the form of software that is processed by a processor. In another example, as explained in more detail below, the modules 203, 204, 206, 208, 210, 212, and 214 may be in the form of firmware that is processed by application specific integrated circuits (ASIC), which may be integrated into a circuit board. Alternatively, the modules 203, 204, 206, 208, 210, 212, and 214 may be in the form of one or more logic blocks included in a programmable logic device (for example, a field programmable gate array). The described modules 203, 204, 206, 208, 210, 212, and 214 may be adapted, and/or additional structures may be provided, to provide alternative or additional functionalities beyond those specifically discussed in reference to FIG. 2. Examples of such alternative or additional functionalities will be discussed in reference to the flow diagrams discussed below.

Figure 3:
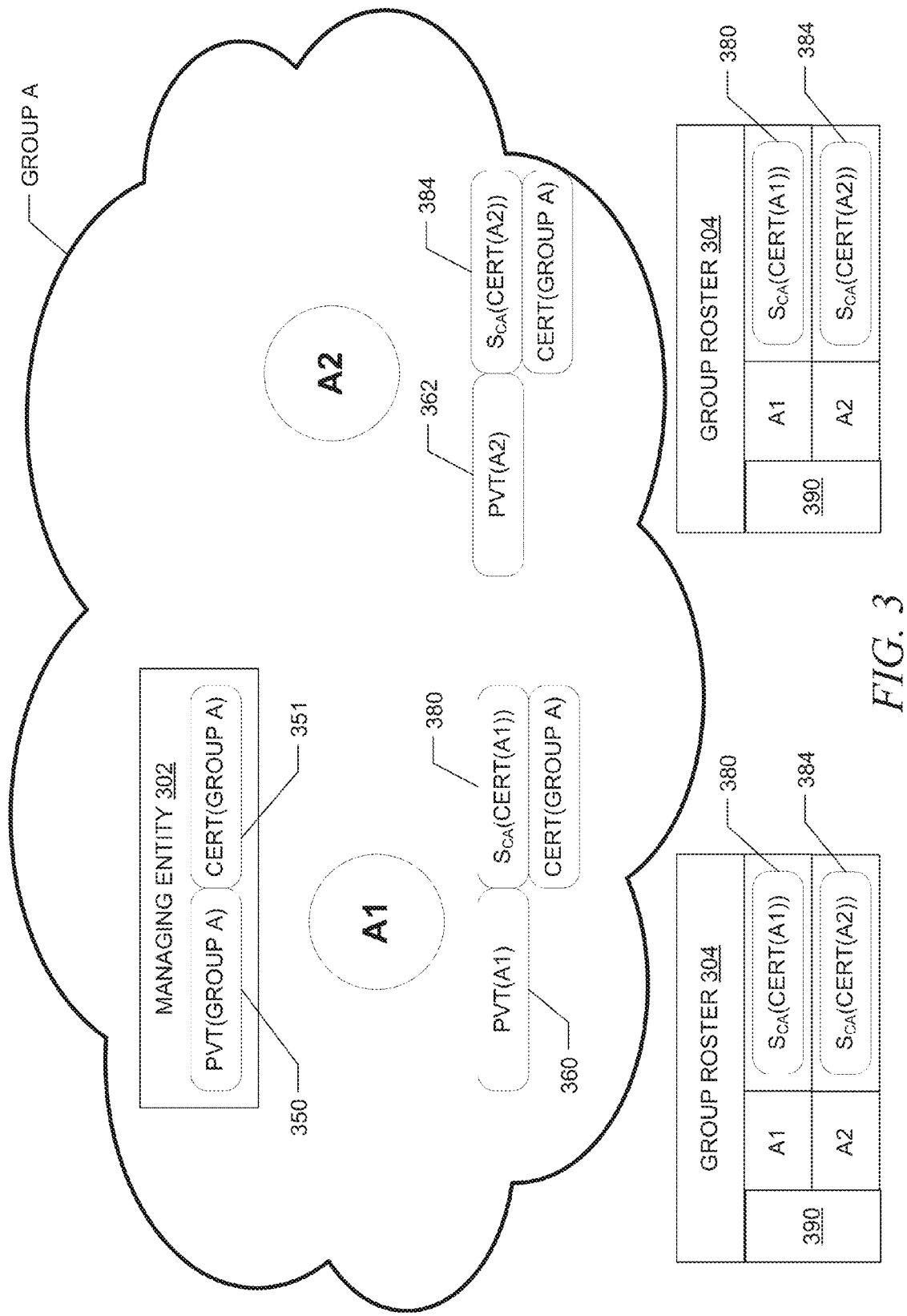
FIG. 3 is a diagram depicting secure communications between member entities, in accordance with an exemplary embodiment of the present invention.

FIG. 3 is a diagram depicting secure communications between member entities, in accordance with an exemplary embodiment of the present invention. As depicted, both entities A1 and A2 are members of group A and can securely communicate with each other. Entity A1 has been designated by, for example, an administrator as the entity responsible for the management of group A (referred to "managing entity" 302) as well as a certification authority for group A. A certification authority, as used herein, refers to an entity that signs digital certificates for use by other entities within a group. Accordingly, a group manager module, for example, associated with entity A1 creates a group digital certificate 351 and a corresponding group private key 350. At the same time, entity A1 also creates a digital certificate and a corresponding private key 360 for itself for secure communication with other entities (e.g., entity A2) that have been admitted into group A. Similarly, entity A2 creates a digital certificate and a corresponding private key 362. The group digital certificate 351 and the group private key 350 are assigned to group A as a whole while the entity A1's and A2's digital certificates and private keys 360 and 362 are used by the entities A1 and A2 to communicate with each other entities in group A. It should be appreciated that a variety of well-known cryptography techniques can be used to create a digital certificate and a corresponding private key.

Given that entity A1 belongs to group A, the group manager module associated with entity A1 signs entity A1's digital certificate with the group private key 350. As depicted in FIG. 3, the signing of entity A1's digital certificate with the group digital certificate 350 creates an authenticated, digital certificate 380. The signing of entity A1's digital certificate with the group private key 350 indicates that entity A1 has been admitted into group A. In other words, the certification authority (or managing entity) 302 only signs entity A1's digital certificate with the group digital key 350 if entity A1 is a member of group A. An administrator or other user makes the decision to admit or remove an entity to or from group A. Similarly, entity A2's digital certificate is signed with the group private key 350 to create an authenticated, digital certificate 384.

After the generation of the authenticated, digital certificates 380 and 384, entity A1, in its role as the entity responsible for the management of group A, adds the authenticated, digital certificates 380 and 384 to a group roster 304 assigned to group A. Additionally, entity A1 acting in this role adds identifiers, used to identify entities A1 and A2, to the group roster 304. Each identifier is a value (numerical or textual) that uniquely identifies an entity or a group of entities. Examples of identifiers include a user name, an organization name, Media Access Control (MAC) address, processor serial number, and other identifiers. As depicted, the identifier "A1" included in the group roster 304 is associated with the authenticated, digital certificate 380. The identifier "A2" included in the group roster 304 is associated with the authenticated, digital certificate 384. As explained in more detail below, other information 390 regarding group A can also be included in the group roster 304. The entity responsible for the management of the group (e.g., A1) distributes a copy of this group roster 304 to all member entities A1 and A2 of group A.

By adding entity A1's and A2's identifiers to the group roster 304, other entities within group A can identify that entities A1 and A2 have been admitted into group A. The authenticated, digital certificates 380 and 384 included in the group roster 304 are used for secure communications between member entities, such as between entities A1 and A2. For example, entity A2 can use entity A1's authenticated, digital certificate 380 to encrypt messages to entity A1. Upon receipt of the encrypted message from entity A2, entity A1 can use its corresponding private key 360 to decrypt the encrypted message, which was originally generated using entity A1's authenticated, digital certificate 380. Vice versa, entity A1 can use entity A2's authenticated, digital certificate 384 to encrypt messages to entity A2. Upon receipt of the encrypted message from entity A1, entity A2 can use its corresponding private key 362 to decrypt the encrypted message, which was originally generated using entity A2's authenticated, digital certificate 384.

With this automatic distribution of the group roster 304 that includes cryptographic information for use in secure communications between member entities A1 and A2, each entity A1 or A2 does not have to be individually and manually reconfigured for secure communication whenever group membership is updated. Furthermore, in some group setups, there is no hierarchal structure where authentication for secure communication needs to follow a hierarchal chain of trust. Instead, in such a group setup, each entity A1 or A2 has the cryptographic information needed to securely communicate with other entities in the group. Therefore, entities A1 and A2 can securely communicate with each other without need to verify with any authoritative or third party entity, such as another entity C (not shown). Examples of such an authentication system may possibly result in a more reliable communication because secure communication can be established without dependency on a third party entity.

Figure 4:
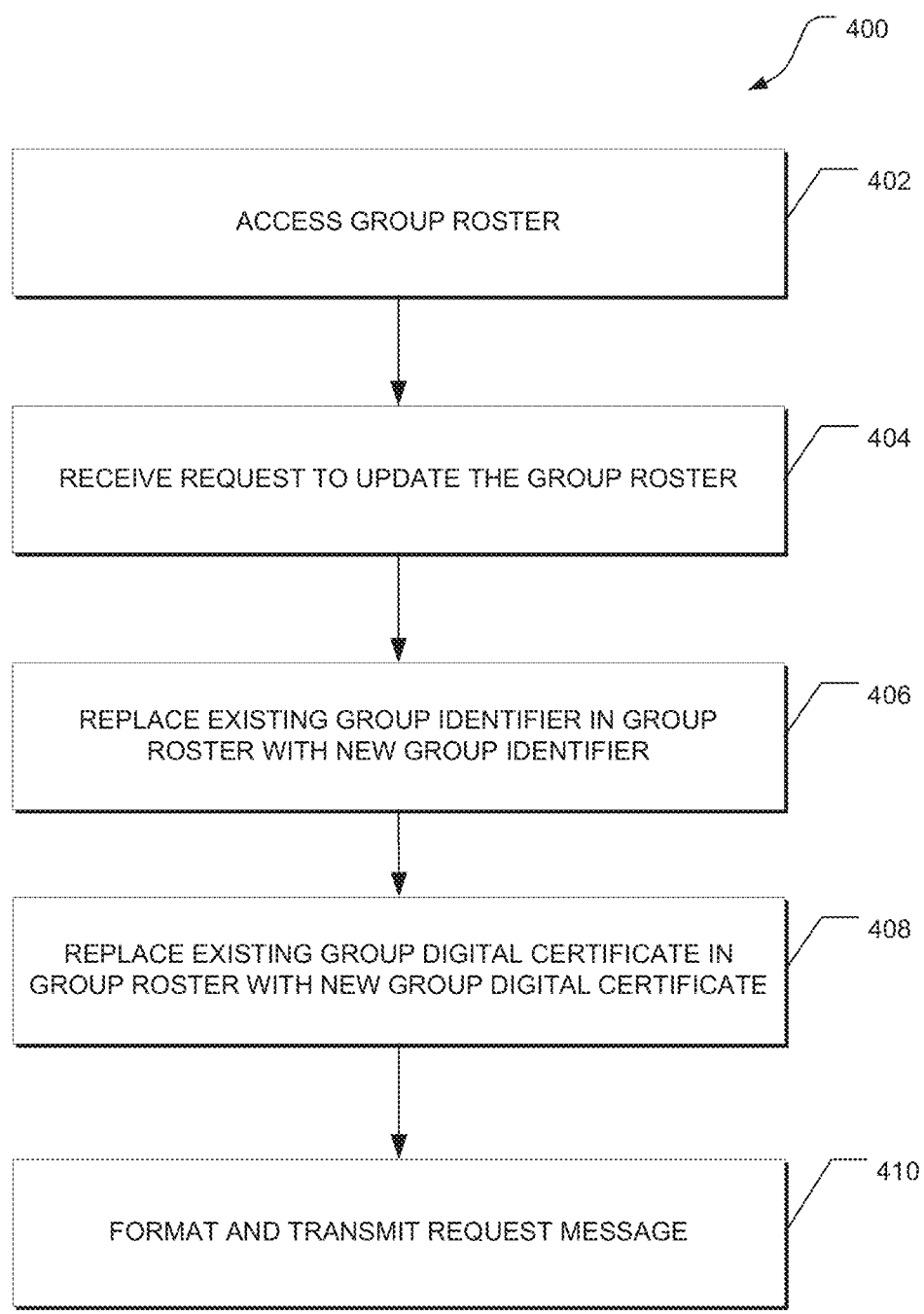
FIG. 4 is a flow diagram depicting a general overview of a method, in accordance with an embodiment, for changing the group membership of one or more entities.

FIG. 4 is a flow diagram depicting a general overview of a method 400, in accordance with an embodiment, for changing the group membership of one or more entities. In exemplary embodiments, the method 400 may be implemented by the group manager module 104 of FIG. 2. As depicted in FIG. 4, the group manager module accesses a group roster at 402. As used herein, the "access" of a group roster or other data can refer to locating and reading the group roster from a storage medium, such as random access memory or non-volatile memory. In one embodiment, the group roster includes the authenticated, digital certificates of many or all entities included within a group. Additionally, the group roster may also include the entities' identifiers. As an example, a group manager module can reference this group roster to identify all entities that have been admitted to the group. Furthermore, the group roster can include a group identifier, a group digital certificate, and a managing entity identifier. The group identifier is a value (numerical or textual) that uniquely identifies a group. As explained in more detail below, the group digital certificate is used both to authenticate the certificates of other entities that are to be admitted into the group, and also to authenticate the group roster as it is distributed from the group manager entity to other entities in the group.

The managing entity identifier is a value (numerical or textual) that uniquely identifies an entity within the group that is designated as a managing entity. As explained above, the managing entity has the certification authority as one of its functions, but the managing entity is also responsible for amending the group roster, and for distributing the group roster to entities in the group. It should be noted that the group roster distribution itself is an authenticated process, in which the transmitted group roster, for example, is signed with the group private key. This authentication mechanism allows members to accept and verify that the updated group roster is received from a legitimate source. Accordingly, duties of the managing entity include, for example, running the certification authority, deciding what group roster updates to accept, and distributing the changed group roster to members.

At 404, the group manager module receives a request from an administrator or other user to update the group roster. In particular, this particular request message is a direction from the administrator of the group, directing the managing entity to alter information about the group as a whole, then propagating that alteration to the entities within the group. This direction includes a group identifier that identifies a different group from the existing group defined in the group roster and includes a group digital certificate associated with this different group. In response to the request, the group manager module replaces the existing group identifier and the existing group digital certificate in the group roster with the newly received group identifier and its group digital certificate, respectively, at 406 and 408. As a result of this replacement, the memberships of one or more entities that have received such a request are changed from the existing group to this other different group, as identified by the newly received group identifier. At 410, the group manager module formats an authenticated request message describing all the changes made to the information about the group as a whole and transmits the request message to the group manager modules on each of the entities listed on the group roster.

Figure 5:
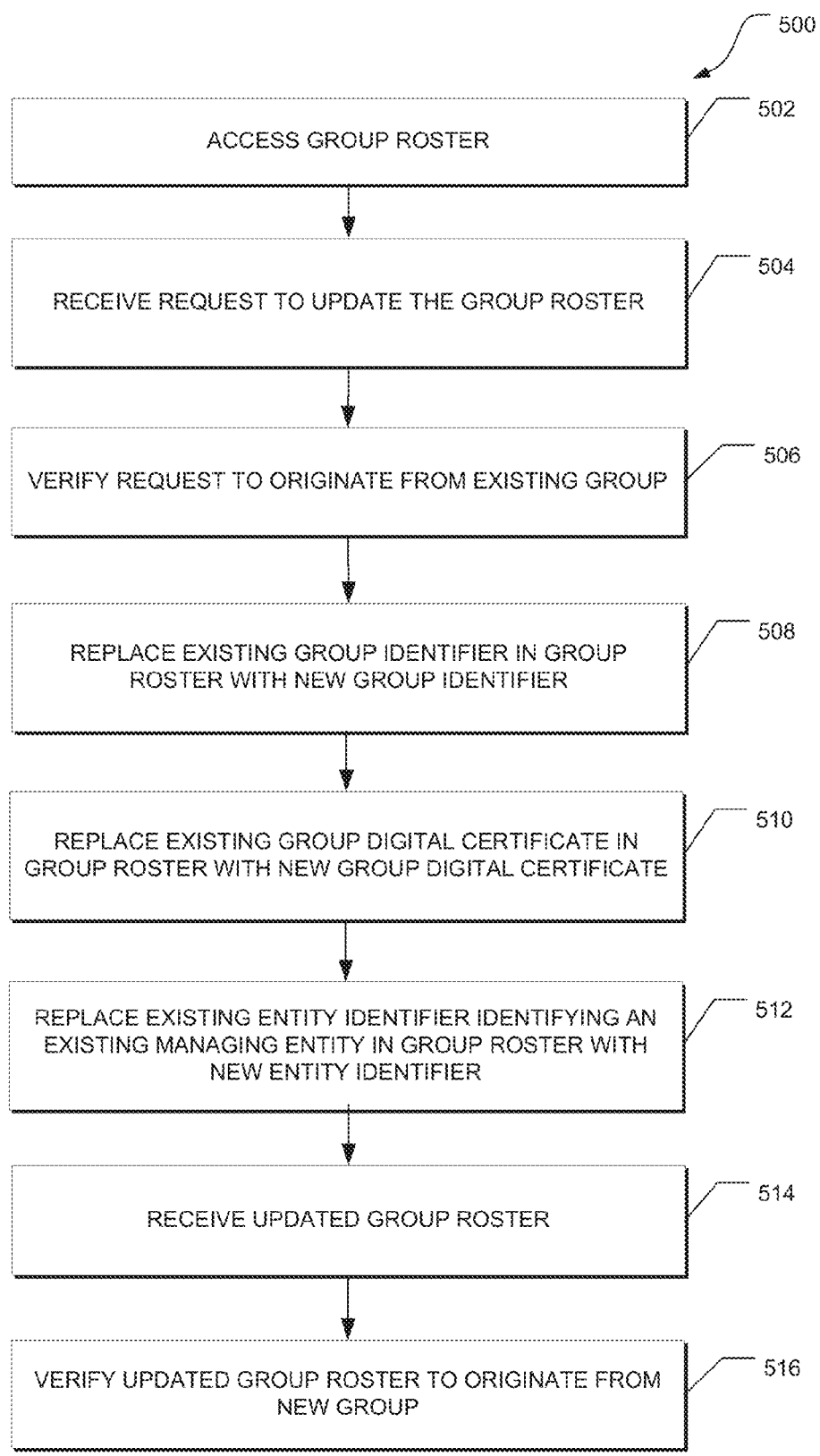
FIG. 5 is a flow diagram depicting a detailed method, in accordance with an embodiment, for changing the group membership of one or more entities.

FIG. 5 is a flow diagram depicting a detailed method 500, in accordance with an embodiment, for changing the group membership of one or more entities. In exemplary embodiments, the method 500 may be implemented by the group manager module 104 of FIG. 2. As depicted in FIG. 5, a group manager module accesses a group roster at 502. In this embodiment, the group roster includes a group identifier, a group digital certificate associated with the group, one or more entity identifiers identifying all the entities that are members of the group, and a managing entity identifier, as described above.

The group manager module receives an authenticated request to update the group roster at 504. This particular request message includes a group identifier (or "new" group identifier) that identifies a different group (or "new" group) from the existing group defined in the group roster, a group digital certificate (or "new" group digital certificate) associated with this new group, and a managing entity identifier (or "new" managing entity identifier) associated with this new group. In this embodiment, this request message is signed using a group private group key associated with the existing group digital certificate included in the group roster. This request message is authenticated for security purposes such that the receiving group entities (other than the group's managing entity) can verify that this update is legitimate. It should be noted that the "signing" of a request message or other data refers to a process of using an encrypted digital signature as an annotation to a variety of data, such as using an encrypted digital signature as an annotation to a request message, a cryptographic key, or a digital certificate. As an example, a signer (e.g., certification authority) computes a 50-100 byte sized digital signature of given data and then encrypts the digital signature with its private key (e.g., a group private key). The given data is then annotated with this encrypted signature, and both can be transmitted together.

Upon receipt of the request, the group manager module then verifies the request at 506 to identify whether this request originated from an entity that is the managing entity of the same group. For example, verification can involve identifying whether a signature of the request message cryptographically matches the group digital certificate.

If the group management module verifies that the request originated from the authorized managing entity, the group manager module then at 508 replaces the existing group identifier in the group roster with the new group identifier. The group manager module also at 510 replaces the existing group digital certificate in the group roster with the new group digital certificate. In addition, the group manager module at 512 replaces the existing managing entity identifier in the group roster with the new managing entity identifier. The replacements of the existing group information with the new group information, as discussed above, effectively change a membership of an entity from an existing group to the new group as identified by the new group identifier.

The new group information received from the request provides the group manager module with information to communicate with the new group. For example, after the receipt of the request, the group manager module may receive an updated group roster from the managing entity for this new group at 514. This updated group roster includes the authenticated, digital certificates of all entities that are members of this new group. In this embodiment, this updated group roster is also signed using a private group key associated with the new group digital certificate. At 516, the group manager module verifies whether this updated group roster originated from an entity within the new group. In the verification, if the group manager module identifies that a signature of the updated group roster cryptographically matches the new group digital certificate, then the group manager module then populates the group roster with all the authenticated, digital certificates of other entities that are members of this new group.

Figure 6:
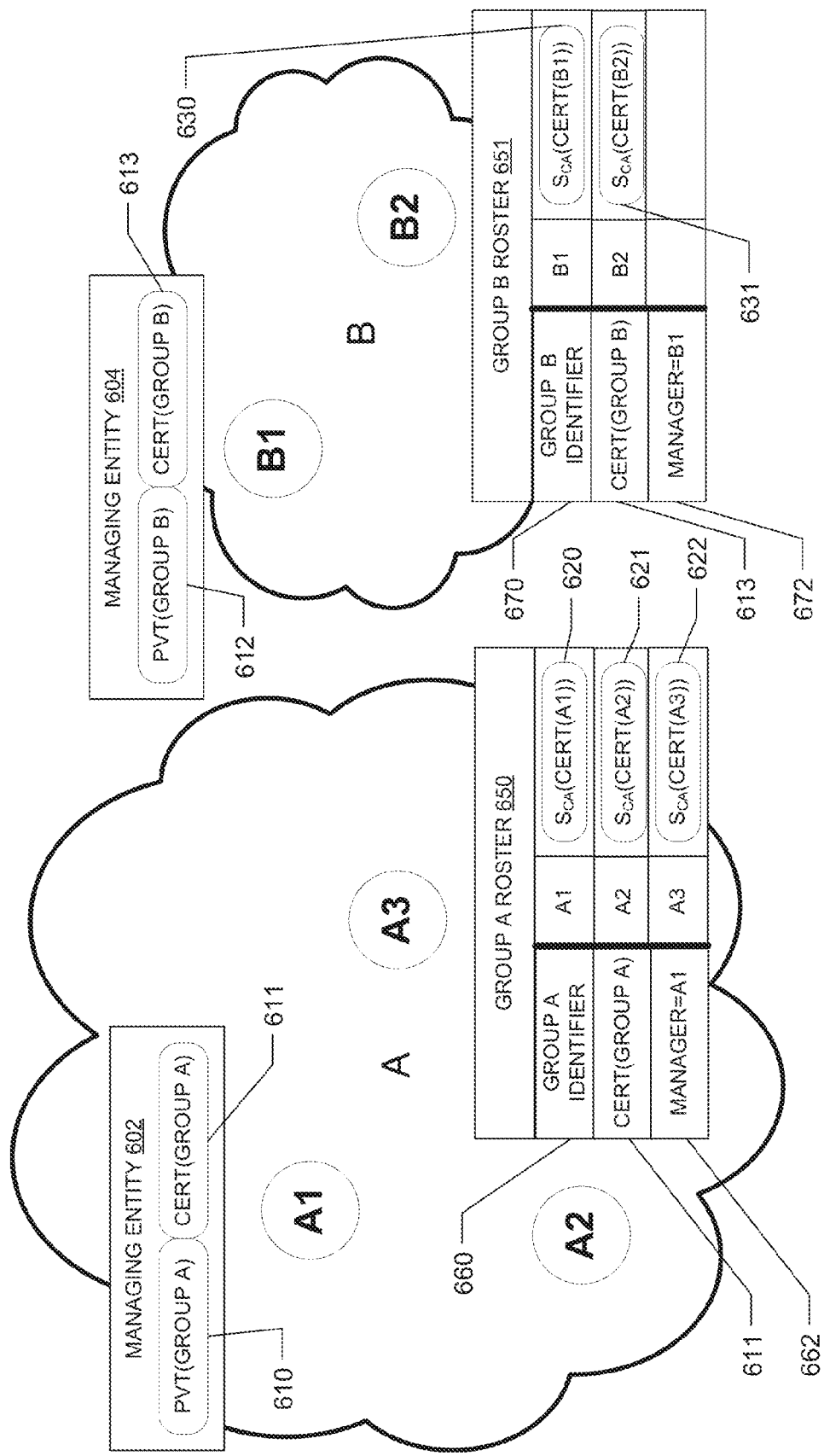
FIGS. 6, 7, and 8 are diagrams depicting a merging of two different groups of entities into a single group, in accordance with an exemplary embodiment of the present invention.
Figure 7:
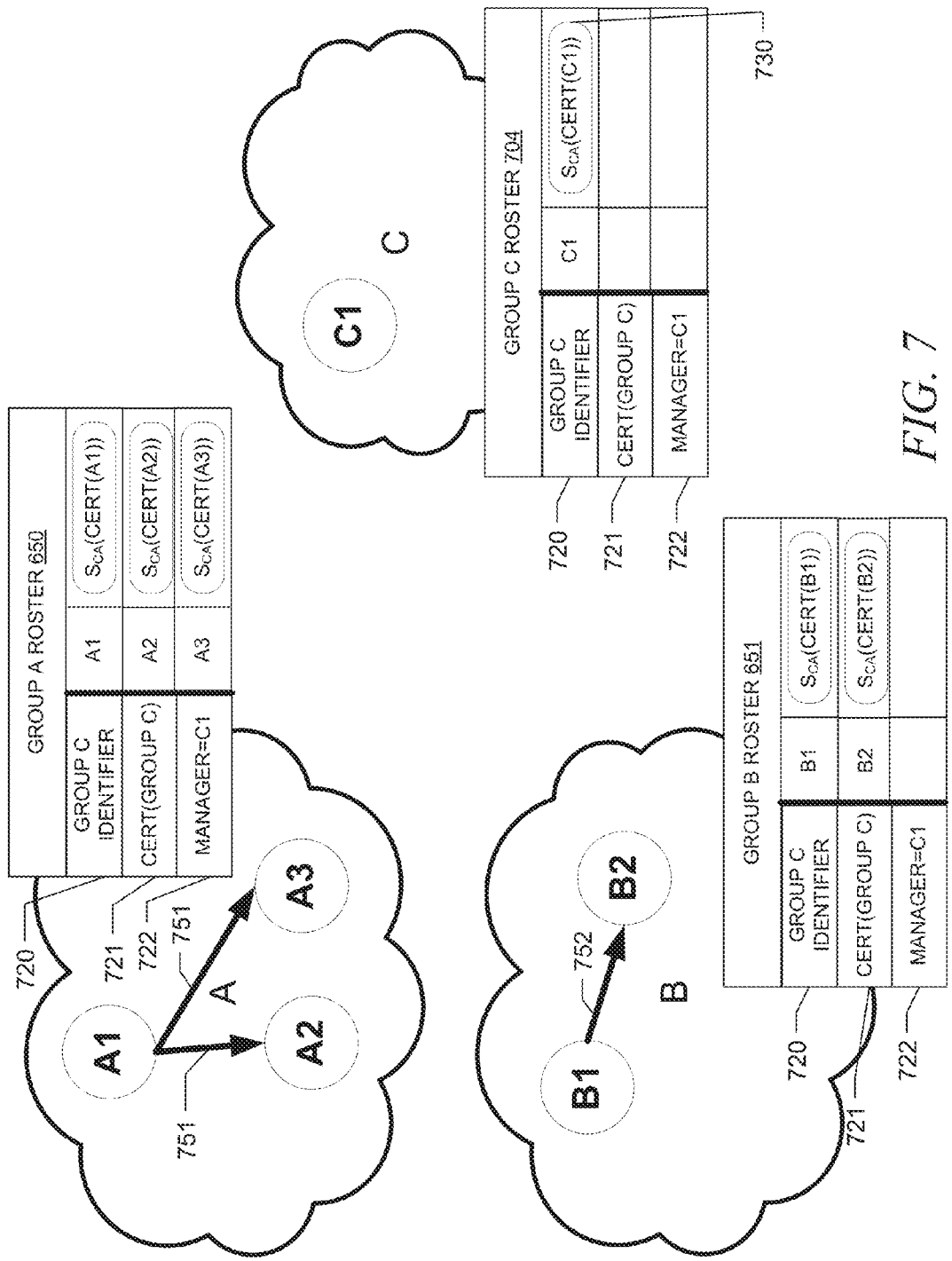
Figure 8:
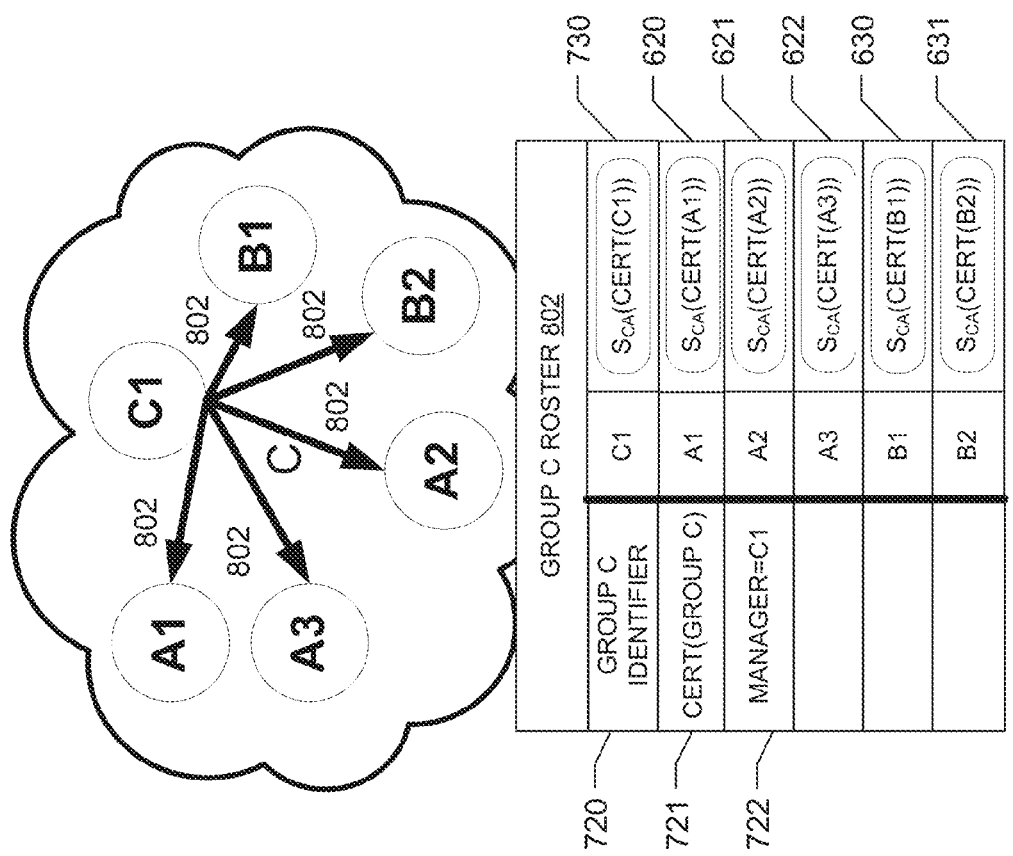

FIGS. 6-8 are diagrams depicting a merging of two different groups of entities into a single group, in accordance with an exemplary embodiment of the present invention. As depicted in FIG. 6, entities A1-A3 are members of group A and can securely communicate with each other. Entities B1-B2 are members of group B and can securely communicate with each other. Entity A1 has been designated as the managing entity 602 for group A, including certification authority for group A, and entity B1 has been designated as the managing entity 604 for group B, including certification authority for group B. Accordingly, a group manager module, for example, associated with entity A1 creates a group digital certificate 611 and a corresponding group private key 610. A group manager module, for example, associated with entity B1 creates a group digital certificate 613 and a corresponding group private key 612. As discussed above, the group digital certificate 611 is used to create authenticated, digital certificates 620-622 for entities A1, A2, and A3 included in group A. Similarly, the group digital certificate 613 is used to create authenticated, digital certificates 630-631 for entities B1 and B2 included in group B.

In the example depicted in FIG. 6, each entity A1, A2, A3, B1, or B2 has a copy of a group roster 650 or 651. That is, each entity A1, A2, or A3, which is a member of group A, has a copy of group A's group roster 650. Each entity B1 or B2, which is a member of group B, has a copy of group B's group roster 651. In this embodiment, each group roster 650 or 651 includes entity identifiers (e.g., A1, A2, and B1), their authenticated, digital certificates (e.g., authenticated, digital certificates 620 and 630), a group identifier (e.g., Group A identifier 660 and Group B identifier 670), a group digital certificate (e.g., group digital certificate 611 and group digital certificate 613), and a managing entity identifier (e.g., managing entity identifier 662 and managing entity identifier 672).

FIG. 7 is a diagram depicting transmissions of request messages to entities within groups A and B to merge these groups into a single group C. An administrator or other user creates a group C having entity C1, which is designated as a certification authority and managing entity for group C. Here, entity C1 has group C's group roster 704, which includes entity identifier C1, its authenticated, digital certificate 730, a group identifier 720 identifying group C, a group digital certificate 721 associated with group C, and a managing entity identifier 722 identifying C1 as the managing entity within group C.

To merge groups A and B into group C, the managing entity of each group A or B transmits request messages to all entities within the respective groups to update the group roster with new group information. In particular, as depicted in FIG. 7, managing entity A1 transmits a request message 751 to each entity A2 or A3 within group A. In one embodiment, the request message 751 includes a group identifier 720 identifying group C, a group digital certificate 721 associated with group C, and a managing entity identifier 722 identifying C1 as the managing entity for the group. In one embodiment, the messages from the managing entities can include new entities in the group rosters. For example, the request message 751 that managing entity A1 transmits to A2 and A3 could include the entities that have heretofore been part of group B (e.g., the identifiers and digital certificates of entities B1 and B2, as well as the entities in group C, such as entity C1). Additionally, message 752 that managing entity B1 transmits to entity B2 could include the entities that have heretofore been part of group A (e.g., the identifiers and digital certificates of entities A1, A2, and A3, as well as the entities in group C, such as entity C1). If the entities within group C cannot communicate with entities within groups A and B, such information included in the request message 751 can be provided to entity A1 out-of-band. For example, an administrator that created group C can provide information about group C to an administrator of group A by, for example, e-mail communication, a physical media that stores the second entity's digital certificate (e.g., Universal Serial Bus (USB) flash drive), or other out-of-band communication. Similarly, managing entity B1 transmits a request message 752 to entity B2 within group B, and this request message 752 also includes the same group C's information, as discussed above. In another example, the same user could serve as the administrator for the managing entities of all three groups A, B, and C (entities A1, B1, and C1), and communication between the entities could correspondingly be simplified.

Upon receipt of the message, each entity A2, A3, and B2 verifies whether the request message 751 or 752 originated from the managing entity for its respective group A or B, in accordance with an embodiment of the present invention. For example, upon receipt of the request message 751, entity A2 identifies whether a signature of the authenticated request message 751 cryptographically matches the group digital certificate associated with group A. If there is a match, then entity A2 can verify that the request message 751 originated from the trusted entity within the same group A. In another example, upon receipt of the message 752, entity B2 identifies whether a signature of the authenticated request message 752 cryptographically matches the group digital certificate associated with group B. If there is a match, then entity B2 can verify that the request message 752 originated from a trusted entity within the same group B.

After verification, each entity A2, A3, or B2 updates its group roster 650 or 651 with the updated group information included in the request message 751 or 752. That is, entity A2 replaces the existing group A identifier, the existing group A digital certificate, and the existing managing entity identifier identifying A1 stored in the group A roster 650 with a new group C identifier, a new group C digital certificate, and a new managing entity identifier identifying C1, respectively. Similarly, entity A3 replaces the existing group A identifier, the existing group A digital certificate, and the existing managing entity identifier identifying A1 stored in the group A roster 650 with the new group C identifier, the new group C digital certificate, and the new managing entity identifier identifying C1, respectively. In group B, entity B2 replaces the existing group B identifier, the existing group B digital certificate, and the existing managing entity identifier identifying B1 stored in the group B roster 651 with the new group C identifier, the new group C digital certificate, and the new managing entity identifier identifying C1, respectively. Given that the managing entities A1 and B1 transmitted the request messages 751 and 752, the entities A1 and B1 also update their group rosters 650 and 651 with updated information for group C in the same manner described above for entities A2, A3, and B2. In one embodiment, the request messages 751 and 752 include information suitable for identifying the entities that have been included in the group rosters for each others' groups and for the new group. For example, entities A2 and A3 are directed to include entities B1, B2, and C1 in the new group roster, and entity B2 is directed to include entities A1, A2, A3, and C1 in the new group roster.

The replacements of the existing group information with new group C information in the group rosters 650 and 651 effectively change a membership of an entity A1, A2, A3, B1, or B2 from an existing group A or B to new group C. For example, the replacements of existing group A information in all group A rosters 650 with new group C information change the membership of entities A1-A3 from group A to group C. Similarly, the replacements of existing group B information in all group B rosters 651 with new group C information change the membership of entities B1 and B2 from group B to group C.

FIG. 8 is a diagram depicting group C as a result of the merge. The replacements of the existing group information with new group C information merge groups A and B into group C. With new group C information, each newly added entity A1-A3 and B1-B2 can communicate with the managing entity C1. As a result, in one embodiment, managing entity C1 subsequently transmits an updated group C roster 802 identifying all entities C1, A1-A3, and B1-B2 that are now members of group C. In particular, this updated group C roster 802 includes entity identifiers C1, A1-A3, and B1-B2, their respective authenticated, digital certificates 730, 620-622, and 630-631, group C identifier 720, group digital certificate 721, and managing entity identifier 722.

Further, in this embodiment, upon receipt of the updated group roster 802, each entity A1, A2, A3, B1, or B2 verifies whether the updated group roster 802 originated from a trusted entity within group C. For example, entity A1 can verify a signature of the authenticated, updated group roster 802 using the group digital certificate 721, which was previously received in a request message. If the verification is valid, then entity A1 updates its group roster with the newly received group C roster 802, which identifies all other entities A2, A3, B1, B2, and C1 that are members of group C and includes their assigned, digital certificates 621, 622, 630, 631, and 730, respectively, for use in secure communication with entity A1.

In an alternate embodiment, instead of a subsequent update of the group C roster 802, the original requests 751 and 752 depicted in FIG. 7 can also include an update to group C roster 802 that identifies all entities C1, A1-A3, and B1-B2 that are now members of group C. Particularly, requests 751 and/or 752 include entity identifiers C1, A1-A3, and B1-B2, their respective authenticated, digital certificates 730, 620-622, and 630-631, group C identifier 720, group digital certificate 721, and managing entity identifier 722.

Figure 9:
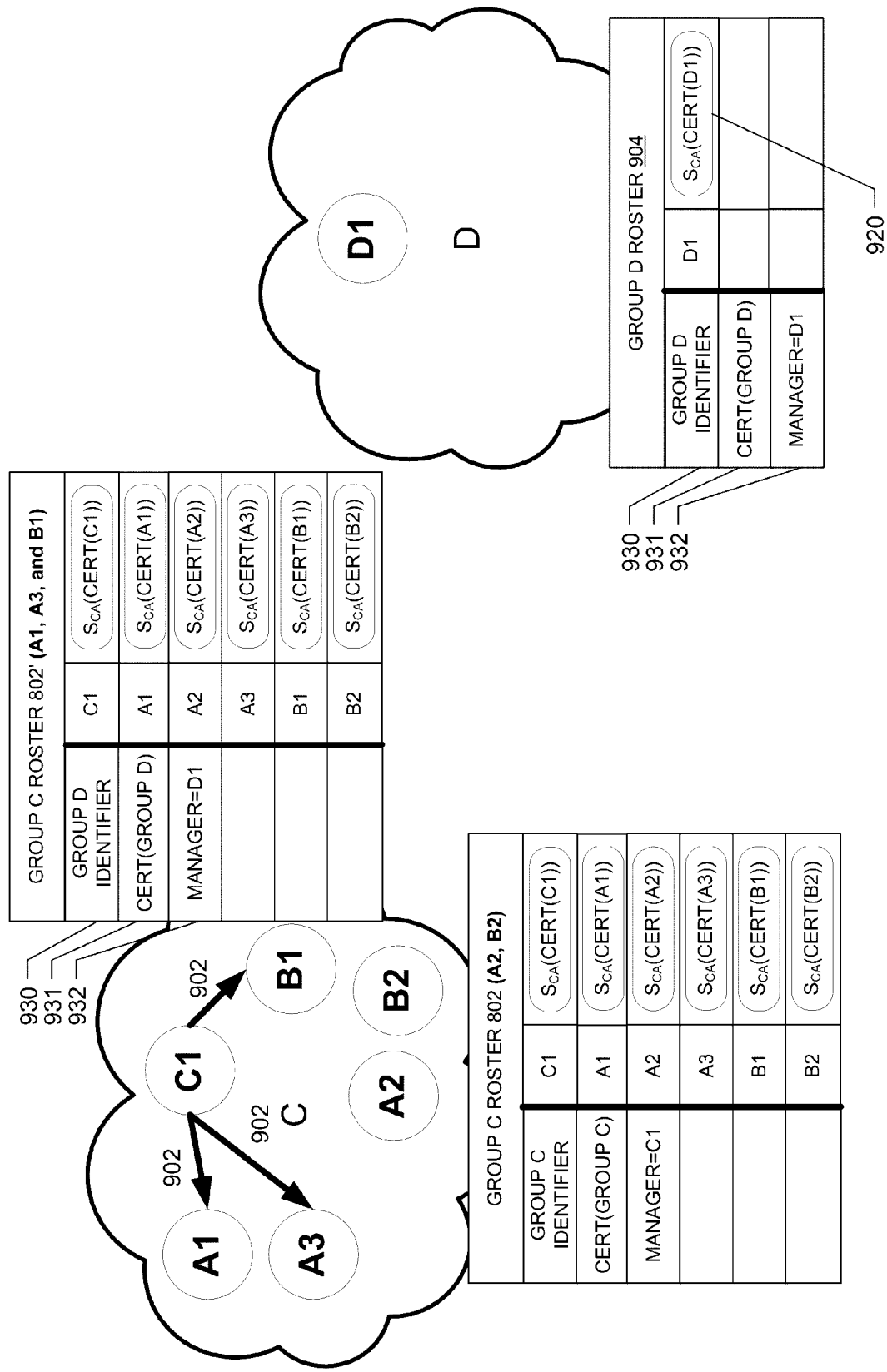
FIGS. 9 and 10 are diagrams depicting a splitting of a single group of entities into two different groups, in accordance with an exemplary embodiment of the present invention.
Figure 10:
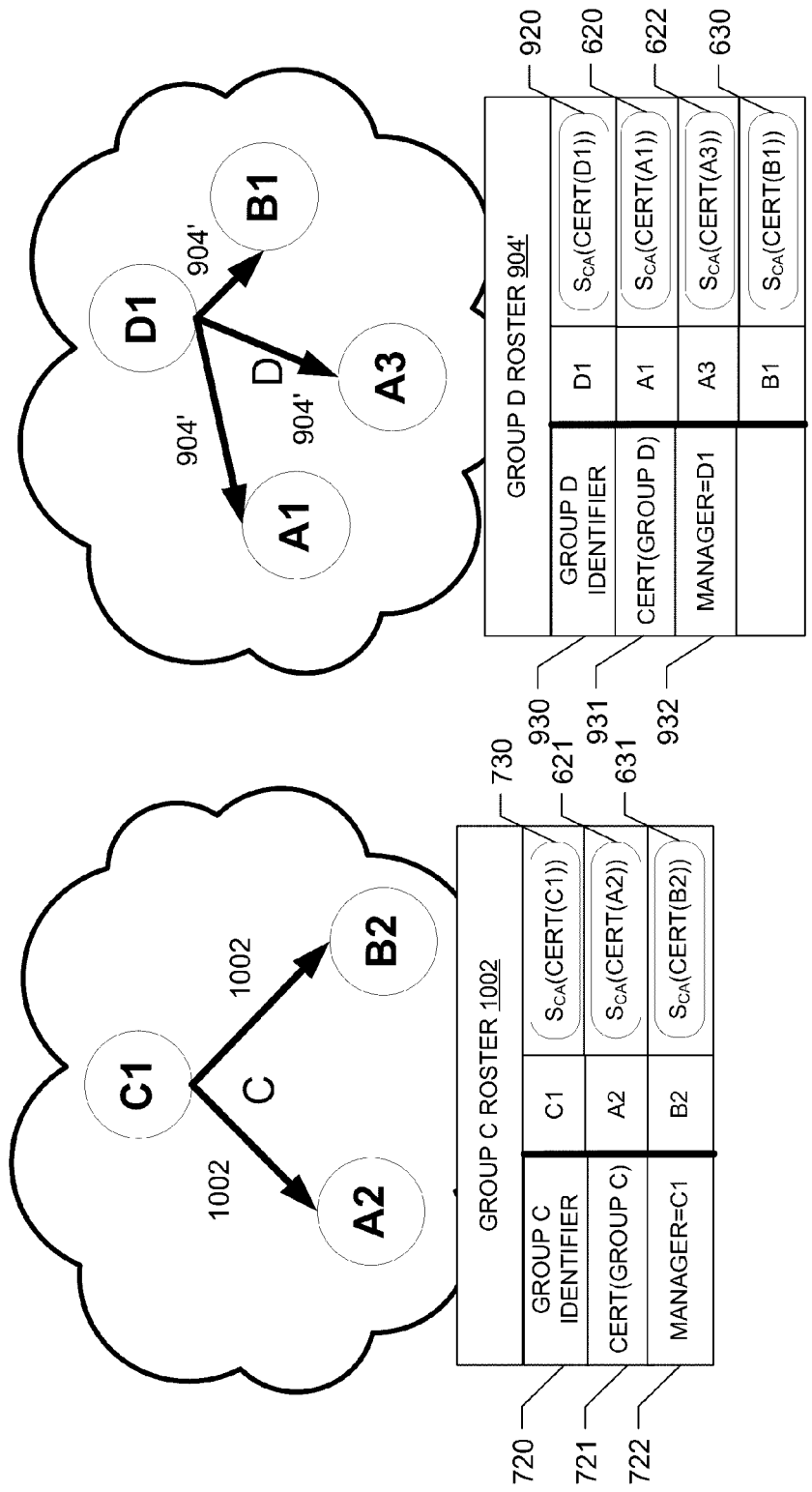

FIGS. 9-10 are diagrams depicting a splitting of a single group of entities into two different groups, in accordance with an exemplary embodiment of the present invention. As depicted in FIG. 9, an administrator or other user wants to split group C into two groups, namely group C and group D. As a result, an administrator or other user creates a group D with entity D1, which is designated as a certification authority and managing entity for group D. Here, entity D1 has or has access to group D's group roster 904. In this example, the group roster 904 includes entity identifier D1, its authenticated, digital certificate 920, a group identifier 930 identifying group D, a group digital certificate 931 associated with group D, and a managing entity identifier 932 identifying D1 as the managing entity within group D.

Here, the administrator wants to split entities A1, A3, and B1 from group C to group D. However, entities A2 and B2 are to remain members of group C. As a result, managing entity C1 transmits request messages 902 only to A1, A3, and B1 requesting an update of their existing group information with updated group D information. It should be noted that before transmittal of the request message 902, each entity A1-A3, B1-B2, and C1 has a copy of group C roster 802, which identifies all entities A1-A3, B1-B2 that are members of group C. Upon receipt of the request message 902, each entity A1, A3, or B1 replaces the existing group C information in group C roster 704 with group D information, namely group D identifier 930, group digital certificate 931, and managing entity identifier 932. After the replacements, as depicted in FIG. 9, entities A1, A3, and B1 have updated group roster 802' while entities A2 and B2 have group C roster 802 that has not been updated or modified Additionally, in one embodiment, message 902 also amends the group roster to match what is intended for group D. That is, message 902 omits the identifiers and certificates for entities A2 and B2, and includes the identifier and certificate for entity D1.

FIG. 10 is a diagram depicting groups C and D as a result of the split. The replacements of the existing group C information with new group D information splits entities A1, A3, and B1 from group C to group D. With the new group D information, each newly added entity A1, A3, and B1 can communicate with managing entity D1. As a result, in one embodiment, managing entity D1 subsequently transmits an updated group roster 904' identifying all entities B1, A1, A3, and D1 that are members of group B. In particular, as depicted in FIG. 10, this updated group D roster 904' includes entity identifiers D1, A1, A3, and B1, their respective authenticated, digital certificates 920, 620, 622, and 630, group D identifier 930, group digital certificate 931, and managing entity identifier 932.

Upon receipt of the updated group roster 904', each entity A1, A3, and B1 verifies whether the updated group roster 904' originated from the managing entity within group D. For example, entity B1 can verify a signature of the authenticated, updated group roster 904' using the group digital certificate 931, which was previously received in the request. If the verification is valid, then entity B1 updates its group roster with the newly received group the roster 904', which identifies all other entities D1, A1, and A3 that are members of group D and includes their assigned, digital certificates 920, 620, and 622, respectively, for use in secure communications with entity B1.

The entities associated with group C have also changed with the removal of entities A1, A3, and B1 from group C. Therefore, managing entity C1 subsequently transmits an updated group roster 1002 identifying all remaining entities C1, A2, and B2 that are members of group C. As depicted in FIG. 10, this updated group C roster 1002 includes entity identifiers C1, A2, and B2, their respective authenticated, digital certificates 730, 621, and 631, group C identifier 720, group digital certificate 721, and managing entity identifier 722.

Upon receipt of the updated group roster 1002, each entity A2 and B2 verifies whether the updated group roster 1002 originated from the managing entity for group C. If the verification is valid, then entities A2 and B2, for example, update their existing group rosters with the newly received group roster 1002.

Figure 11:
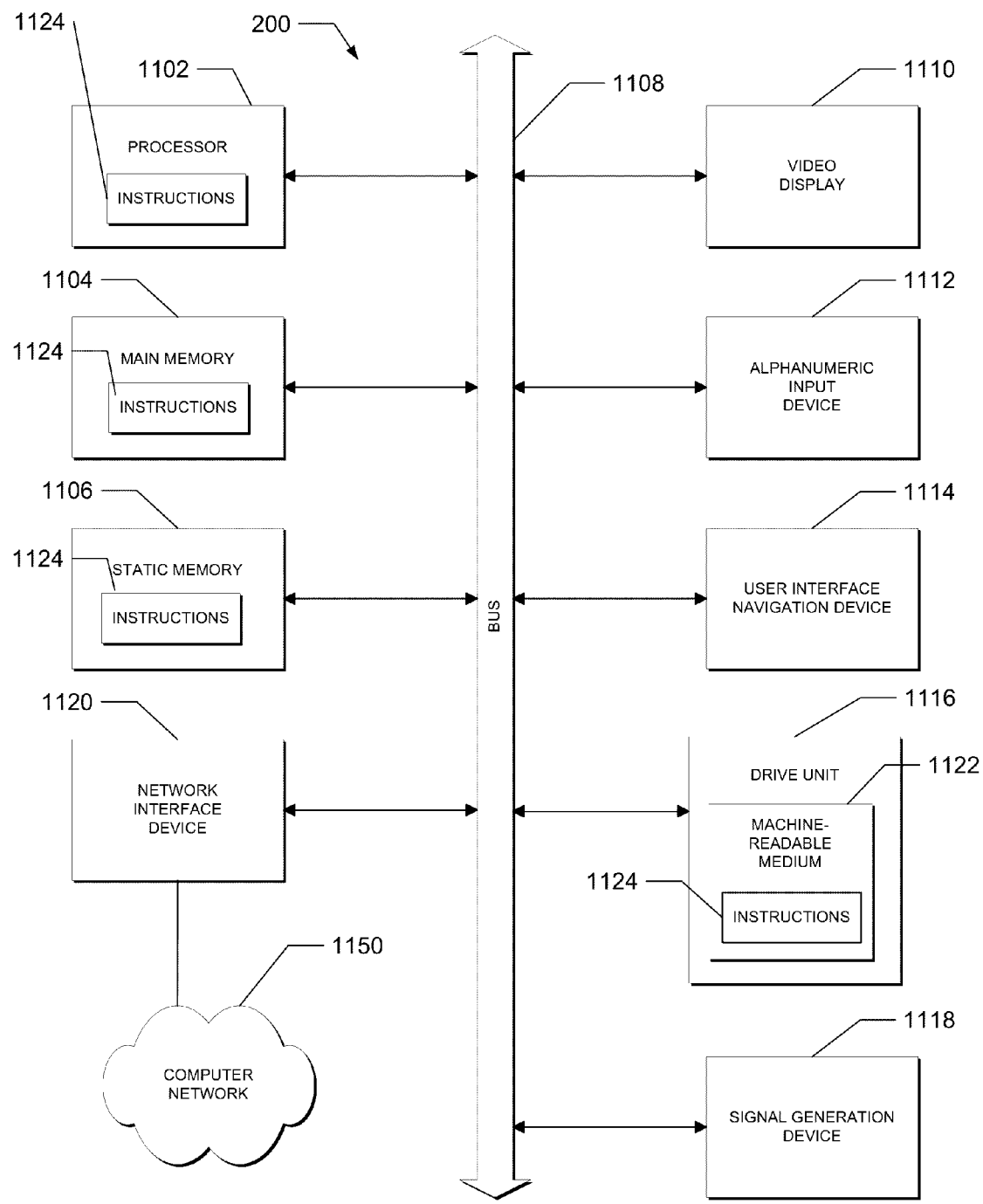
FIG. 11 depicts a hardware block diagram of a machine in the example form of a processing system within which may be executed a set of instructions for causing the machine to perform any one or more of the methodologies discussed herein.

FIG. 11 depicts a hardware block diagram of a machine in the example form of a processing system 200 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the processing system 200 includes a processor 1102 (e.g., a central processing unit (CPU), a graphics processing unit (GPU) or both), a main memory 1104 (e.g., random access memory), and static memory 1106 (e.g., static random-access memory), which communicate with each other via bus 1108. The processing system 200 may further include video display unit 1110 (e.g., a plasma display, a liquid crystal display (LCD) or a cathode ray tube (CRT)). The processing system 200 also includes an alphanumeric input device 1112 (e.g., a keyboard), a user interface (UI) navigation device 1114 (e.g., a mouse), a disk drive unit 1116, a signal generation device 1118 (e.g., a speaker), and a network interface device 1120.

The disk drive unit 1116 (a type of non-volatile memory storage) includes a machine-readable medium 1122 on which is stored one or more sets of data structures and instructions 1124 (e.g., software) embodying or utilized by any one or more of the methodologies or functions described herein. The data structures and instructions 1124 may also reside, completely or at least partially, within the main memory 1104 and/or within the processor 1102 during execution thereof by processing system 200, with the main memory 1104 and processor 1102 also constituting machine-readable, tangible media.

The data structures and instructions 1124 may further be transmitted or received over a computer network 1150 via network interface device 1120 utilizing any one of a number of well-known transfer protocols (e.g., HyperText Transfer Protocol (HTTP)).

Certain embodiments are described herein as including logic or a number of components, modules, or mechanisms. Modules may constitute software modules (e.g., code embodied on a machine-readable medium or in a transmission signal) and/or hardware modules. A hardware module is a tangible unit capable of performing certain operations and may be configured or arranged in a certain manner. In example embodiments, one or more computer systems (e.g., the processing system 200) or one or more hardware modules of a computer system (e.g., a processor 1102 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 1102 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 1102 configured using software, the general-purpose processor 1102 may be configured as respective different hardware modules at different times. Software may accordingly configure a processor 1102, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 1102 that are temporarily configured (e.g., by software) or permanently configured to perform the relevant operations. Whether temporarily or permanently configured, such processors 1102 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 1102 or processor-implemented modules. The performance of certain of the operations may be distributed among the one or more processors 1102, not only residing within a single machine, but deployed across a number of machines. In some example embodiments, the processors 1102 may be located in a single location (e.g., within a home environment, an office environment or as a server farm), while in other embodiments the processors 1102 may be distributed across a number of locations.

While the embodiment(s) is (are) described with reference to various implementations and exploitations, it will be understood that these embodiments are illustrative and that the scope of the embodiment(s) is not limited to them. In general, techniques for scaling groups of authenticated entities may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A computer-implemented method of group management of authenticated entities, the computer-implemented method being performed by an entity and comprising:
   accessing a group roster that includes a first group identifier identifying a first group, a first group digital certificate associated with the first group, and a first entity identifier identifying the entity as a member of the first group;
   receiving a request to update the group roster, the request including a second group identifier identifying a second group and a second group digital certificate associated with the second group;
   authenticating the request using the first group digital certificate; and
   upon determining that the request is signed using the first group digital certificate associated with the first group, enabling secure communications between the entity and other entities of the second group by changing a membership of the entity from the first group to the second group, wherein changing the membership includes:
      replacing the first group identifier in the group roster with the second group identifier; and
      replacing the first group digital certificate with the second group digital certificate.

2. The computer-implemented method of claim 1, wherein replacing the first group digital certificate with the second group digital certificate disables secure communications between the entity and other entities of the first group.

3. The computer-implemented method of claim 1, wherein the replacement merges the entity into the second group.

4. The computer-implemented method of claim 1, wherein the replacement splits the entity from the first group.

5. The computer-implemented method of claim 1, wherein the group roster further includes an authenticated, digital certificate associated with the entity, the authenticated, digital certificate being signed with the first group digital certificate.

6. The computer-implemented method of claim 1, further comprising receiving an authenticated, updated group roster subsequent to the receipt of the request, the authenticated, updated group roster including authenticated, digital certificates of other entities included in the second group, the authenticated, digital certificates being signed with the second group digital certificate.

7. The computer-implemented method of claim 1, wherein the request further includes authenticated, digital certificates of other entities included in the second group, the authenticated, digital certificates being signed with the second group digital certificate.

8. The computer-implemented method of claim 1, further comprising verifying a signature of an authenticated, updated group roster using the second group digital certificate.

9. The computer-implemented method of claim 1, wherein an authenticated, updated group roster is signed using a private group key associated with the second group.

10. A non-transitory, machine-readable medium that stores instructions, which, when performed by a machine that is associated with an entity, cause the machine to perform operations comprising:
    accessing a group roster that includes a first group identifier identifying a first group, a first group digital certificate associated with the first group, a first entity identifier identifying the entity as a member of the first group, and a second entity identifier identifying a first managing entity associated with the first group;
    receiving an authenticated request from a different entity in the first group to update the group roster, the authenticated request including a second group identifier identifying a second group, the second group including a second group entity, a second group digital certificate associated with the second group, and a third entity identifier identifying a second managing entity associated with the second group;
    identifying a signature of the authenticated request to cryptographically match the first group digital certificate; and
    upon identifying the signature to cryptographically match the first group digital certificate associated with the first group, enabling secure communications between the entity and the second group entity by changing a membership of the entity from the first group to the second group, wherein changing the membership includes:
       replacing the first group identifier in the group roster with the second group identifier;
       replacing the first group digital certificate with the second group digital certificate; and
       replacing the second entity identifier with the third entity identifier.

11. The non-transitory, machine-readable medium of claim 10, the operations further comprising receiving an authenticated, updated group roster subsequent to the receipt of the authenticated request, the authenticated, updated group roster including authenticated, digital certificates of other entities included in the second group, the authenticated, digital certificates being signed with the second group digital certificate.

12. The non-transitory, machine-readable medium of claim 11, the operations further identifying an additional signature of the authenticated, updated group roster to cryptographically match the second group digital certificate.

13. The non-transitory, machine-readable medium of claim 10, wherein the request further includes authenticated, digital certificates of other entities included in the second group, the authenticated, digital certificates being signed with the second group digital certificate.

14. A system configured to manage a group of authenticated entities, the system comprising:
a first entity including a memory and logic, at least a portion of the logic in circuitry coupled to the memory, the first entity to:
generate a request to update a group roster that includes a first group identifier identifying a first group and a first group digital certificate associated with the first group, wherein the request includes a second group identifier identifying a second group and a second group digital certificate associated with the second group; and
sign the request using a private group key associated with the first group digital certificate; and
a second entity to:
receive the request to update the group roster;
authenticate the request using the first group digital certificate; and
upon determining that the request is signed using a private group key associated with the first group digital certificate, enable secure communications between the second entity and the first entity by changing membership of the second entity from the first group to the second group, wherein changing the membership includes:
replacing the first group identifier in the group roster with the second group identifier; and
replacing the first group digital certificate with the second group digital certificate.

15. The system of claim 14, wherein replacing the first group digital certificate with the second group digital certificate further enables secure communications between the second entity and other entities of the second group.

16. The system of claim 14, wherein replacing the first group digital certificate with the second group digital certificate disables secure communications between the second entity and other entities of the first group.

17. The system of claim 14, wherein the second entity is to further:
receive an authenticated, updated group roster subsequent to the receipt of the request, the authenticated, updated group roster including authenticated, digital certificates of other entities included in the second group, the authenticated, digital certificates being signed with the second group digital certificate.

18. The system of claim 17, wherein the second entity is to further:
verify a signature of the authenticated, updated group roster using the second group digital certificate.

19. The system of claim 17, wherein the authenticated, updated group roster is signed using a private group key associated with the second group.

20. A computer-implemented method of group management of authenticated entities, the computer-implemented method being performed by an entity and comprising:
accessing a group roster that includes a first group identifier identifying a first group, a first group digital certificate associated with the first group, and a first entity identifier identifying the entity as a member of the first group;
receiving a request to update the group roster, the request including a second group identifier identifying a second group and a second group digital certificate associated with the second group;
authenticating the request using the first group digital certificate; and
upon determining that the request is signed using the first group digital certificate associated with the first group, enabling secure communications between the entity and other entities of the second group by merging the entity into the second group, wherein the merging includes:
replacing the first group identifier in the group roster with the second group identifier; and
replacing the first group digital certificate with the second group digital certificate.

21. A computer-implemented method of group management of authenticated entities, the computer-implemented method performed by an entity and comprising:
accessing a group roster that includes a first group identifier identifying a first group, a first group digital certificate associated with the first group, and a first entity identifier identifying the entity as a member of the first group;
receiving a request to update the group roster, the request including a second group identifier identifying a second group and a second group digital certificate associated with the second group, the second group including a second group entity;
authenticating the request using the first group digital certificate; and
upon determining that the request is signed using the first group digital certificate associated with the first group, enabling secure communications between the entity and the second group entity by switching the entity from the first group to the second group, wherein the switching includes:
replacing the first group identifier in the group roster with the second group identifier; and
replacing the first group digital certificate with the second group digital certificate.

22. The computer-implemented method of claim 21, wherein the entity is not manually reconfigured for secure communication upon membership change of the entity.

* * * * *